United States Patent [19]
Struzer

[11] Patent Number: 5,704,527
[45] Date of Patent: Jan. 6, 1998

[54] ENCASEMENT ENCLOSED PORTABLE ATTACHABLE/DETACHABLE ENTERTAINMENT UNIT: "THE BOX"

[76] Inventor: Cheryl R. Struzer, 53 Glenmanor Way, Thornhill, Ontario, Canada, L4J 3A3

[21] Appl. No.: 686,168

[22] Filed: Jul. 22, 1996

Related U.S. Application Data

[60] Division of Ser. No. 84,596, Jul. 1, 1993, which is a continuation-in-part of Ser. No. 830,864, Feb. 4, 1992, abandoned.

Foreign Application Priority Data

Aug. 21, 1991 [CA] Canada ................... 2049579-1

[51] Int. Cl.$^6$ ................................ B60R 11/02
[52] U.S. Cl. .................. 224/547; 224/409; 224/558; 224/563; 224/566; 224/929
[58] Field of Search ................... 224/409, 547, 224/558, 563, 572, 929, 566; 248/201, 102, 103, 104

[56] References Cited

U.S. PATENT DOCUMENTS

| | | | |
|---|---|---|---|
| 1,014,004 | 1/1912 | Irwin | 248/102 |
| 2,214,882 | 9/1940 | Eades | 248/102 |
| 2,565,132 | 8/1951 | Kantor | 224/572 |
| 2,635,797 | 4/1953 | Siebert | 224/563 |
| 4,995,537 | 2/1991 | Thedieck | 224/563 |

*Primary Examiner*—Linda J. Sholl

[57] ABSTRACT

An easily portable, easily attachable, light-weight, encased entertainment unit, adapted for mounting onto moving vehicles. The encasement box of the entertainment unit is equipped to fit onto corresponding modes of attachment which are secured on vehicle, and which are designed to receive the encasement box, and therefore cooperate with the mounting of the entertainment unit.

The entertainment unit consists of one of the following, or a combination of some: television, radio, cassette player, c.d. player, v.c.r., and any other electronic equipment deemed suitable for the nature of this invention. The encasement box of the entertainment unit is designed with

- a carved out portion, semi-circular, meant to fit over tubular clips fastened to place of attachment via screws and nuts;
- square protrusions, which fit into square rings which hang from straps which are secured to other square rings which are fastened onto place of attachment via the curved extensions, screws, and nuts;
- a female-headed, snap-studded lid cover meant to snap onto male-headed, snap-studded material strap which is secured via loops in material onto curved extensions on each end of the strap which fasten to place of attachment by screws and nuts; and
- a carved-out rectangular portion, onto which straps holding clip-attached rectangular rings loop onto, said clips meant to hook onto rings which are fastened onto place of attachment via their curved extensions, screws and nuts.

Adjustment means are also included in all attachment modes to facilitate adaptation of entertainment unit to a number of different heights.

10 Claims, 4 Drawing Sheets

ENCASEMENT ENCLOSED PORTABLE ATTACHABLE/DETACHABLE ENTERTAINMENT UNIT: "THE BOX"

CROSS REFERENCES TO RELATED APPLICATIONS

This application is a divisional of Ser. No. 08/084,596 filed Jul. 1, 1993, which is a Continuation in Part, of application Ser. No. 07/830,864 filed Feb. 4, 1992, now abandoned

BACKGROUND OF THE INVENTION

1. Field of the Invention

This invention relates to an easily attachable or detachable portable entertainment unit which is enclosed in an encasement, and which attaches easily to all kinds of strollers as well as to an assortment of other vehicles such as bicycles, golf-carts, wheelchairs, handcarts, skidoos, or any surface deemed suitable for said attachment, via adjustable mounting means built into said encased unit, meant to cooperate with attachments fastened onto vehicles or other places of attachment.

2. Description of the Prior Art

Wheel-chairs are an important means of transportation for many individuals. Bicycles are used for a wide variety of purposes. Skidoos, and golf-carts are modes of transportation as well. All these methods of transporting people and goods serve their purposes well. There is added enjoyment, while utilizing these transportation methods, when one can take along a form of entertainment. Sometimes, access to a radio can prove to be a necessity as well; For example, when one needs a weather forecast.

Carrying a portable radio in one's purse, or dragging a portable television along to the park for entertainment, can be cumbersome, or a hassle. They don't easily fit into your pocket, and when it rains, one is caught with the potential of damaging the equipment. To a mother, it is far more important to remember the necessities, than the luxuries, when filling an already over-stuffed diaper bag.

It isn't very practical for one to ride a bike, or walk a baby, while wearing headphones, the usual mode for listening to portable radios outdoors. It is unsafe. One can't hear the traffic, a necessity to safety while riding a bicycle, and one can't hear a baby, a significant consideration. Then, there is the added hindrance of finding a place on your bike to somehow hook your unequipped-to-be-mounted radio onto. A person riding a bike needs both his hands on his handlebars, not fumbling around rearranging the radio which is about to fall out of his shirt pocket.

However, there is now a way to improve the time spent while employing any one of these modes of transportation. In this invention, we have a portable and attachable, lightweight, encased entertainment unit, which can attach to any one of these modes of transportation. Attachments are secured onto the vehicle's handles, and the encased unit attaches to the handles via these attachments which cooperate with attachments built into said encasement. Aside from the obvious and practical uses of portable entertainment such as enjoyment, leisure, keeping in touch with the news, these units are designed to be easily employed, convenient, safe, and completely protected from any outdoor elements by their unique protective, encasements.

A baby can be lulled to sleep outdoors with music. A mother can watch a soap-opera in a park while her child sleeps and breathes fresh air. Someone at a ball park can watch replays in their hand, even when it's raining. A person on a long bike ride can pause for a television show. Someone on a long hike, can bring along their favourite cassette, or video cassette, to watch or listen to, perhaps where t.v. signals and radio signals are out of reach. Children can watch a movie in a park. There is no limit to the ways these entertainment units can be utilized. The encased units can be adjusted for use on a boat, providing entertainment as well as weather updates. In miniaturized versions, an encased entertainment unit containing a radio, can perhaps be attached to a ski pole, making the ride up the chair lift, or tow-line pass quickly as well as more enjoyably. These are only a few of the ways these encased entertainment units can be employed.

Numerous types of carriers are available for carrying objects or attaching things to vehicles or railings.

I have studied the patents that were cited as being similar in nature to my own invention, and I have concluded the following, based on a comparison:

CARMODY, U.S. Pat. No. 4,949,924:
  discloses a support fixture for mounting on railings and the like. This would not be suitable for mounting my encased entertainment units. His fixture would not adapt to handlebars of bicycles or wheelchairs, or any of the vehicles I have mentioned above. As well, although his fixture might support a radio while attached to a railing, the moment there was some movement, the radio would come crashing down to the ground. My methods of encasement attachment are not similar to his. The only thing that our inventions have in common is that they are mountable, supportive fixtures.

BRINKERHOFF, U.S. Pat. No. 371,665:
  discloses a picture hook hanger. The nature of his invention is far too delicate for the nature of my intended unit. No entertainment unit, no matter how lightweight and miniaturized, would be secured properly by his picture hooks. Aside from the obvious weight restrictions, any motion of a stroller, any bumpy ride, or slight push of a baby's hand, would dislocate the unit. Aside from these facts, my attachment modes are quite distinct from his, probably because they are intended to support something of a different nature than his are. The inventions might both support, but other than this common purpose, they are significantly different.

NIDERMAYER, U.S. Pat. No. 2,558,372:
  discloses a luggage or package carrier for baby carriages. Aside from the fact that his invention is limited to what it can be mounted on, there is a limit to when it can be used practically. There is absolutely no protection for the entertainment unit placed inside his carrier, which deems it totally impractical for certain weathers and seasons. The unit is bulky, and would be awkward if attached to certain modes of transportation, for example, on a bicycle. It would get in the way of the proper usage of certain vehicles I have referred to as acceptable for attachment of my entertainment unit. And aside from the similarity of having a radio mounted somewhere near the stroller, the design of his invention is quite remote from my own.

Furthermore, there is no mode for securing a radio or any other device solidly, within his carrier. His carrier is intended to carry items, but does not protect the items from certain movements. His carriers are limited to calm-paced transportation modes. On a skidoo, if his carrier was holding a radio, the radio would most definitely be dislodged during any movement. And even if his carrier was somehow attached to a bicycle, for example, anything inside the carrier would jump out when the bicycle hit some rough terrain. And if a person wanted to fold their stroller holding his carrier, they would definitely have to unscrew all the attachments in order to do so. Whereas if one wanted to fold a stroller holding one of my units, they would simply remove the unit from its attachment mode, said mode remaining on the handlebars as the stroller was folded.

MOSER, U.S. Pat. No. 373,472:
  discloses an adjustable lantern holder. His invention is not suitable for attachment to handlebars or any other modes of transportation I have cited in my application or Continuation in Part. My entertainment units would fall off a bicycle if they were attached by his mode of attachment. There would be no protection from the elements for them as well. His design is too long and bulky to be practical in any of the intended uses I have set forth, for my entertainment units.

TRINGALI, U.S. Pat. No. 2,588,671:
  discloses a holder for a radio on vehicle handlebars. However, his holder is not practical for all sorts of weather and seasons. There is no protection for the entertainment unit. As well, his attachments are not simply detachable, rendering the radio not easily removable. His holder is limited in what it will secure.

SUKUP, U.S. Pat. No. 5,054,732:
  discloses an intravenous feeder support for a stroller. The support is limited to the kind of stroller it can be attached to. The box would not hold my entertainment unit sufficiently securely. The unit would jump right up and out of the support box he invented, pending a bumpy ride on a bicycle or a skidoo. Most of the vehicles I have mentioned wouldn't even have room for attachment of his device. It is not a practical one for all my intents and purposes. There are far more brackets than necessary for use as one of my entertainment unit's encasement's mode of attachment. There is also no adequate protection from the elements for an un-encased entertainment unit placed in one of his boxes. There isn't even a lid. As well, the boxes do not attach and detach easily enough to be considered efficient for my purposes. The only thing portable about his boxes are the items one might place in his box (i.e. the intravenous feeder it is intended to carry).

The box would have to remain a fixture unless one wanted to be consistently burdened with the task of removing screws and rearranging them. The box is impractical for use with fold up strollers, as it would get in the way of the folding up procedure, and prove to be more of a hindrance than a help. Except for the fact that the box is attached to a stroller, the idea of his invention is different in nature and design than mine. His invention is intended for different usage than is mine, and therewith the distinctions are eminent. The methods of attachment he describes are different from my encased entertainment unit's method as well. His attachments are more structured, and far more complicated than need be for securement of my entertainment units. Also, they are far less flexible in nature. My attachments are easier to use, less confining, not limiting in any permanent nature, more useful, and far more practical for my encased entertainment unit's purposes and design. Furthermore, his attachments, which secure the support box to the handlebars of the stroller, are not in any way attached to the contents of the box (the intravenous feeder). Thereby, there is a limit to the attachments' use in supporting the contents of the box. My encasement boxes snugly enclose the entertainment units, and these units are then secured by their attachments directly. This helps secure them onto the vehicle more supportively. The encasement boxes, built around the entertainment units, hold them completely. And the encasement boxes are secured onto the place of attachment via their own built-in attachment mode.

MAFFEI, U.S. Pat. No. 4,410,158:
  discloses an over-bed television support frame, which holds a television above a bed in a completely different manner than my invention. All my entertainment units mount onto bicycles as well as other vehicles. Televisions are not easily portable or removable when mounted via his invention. And his mode is not adaptable to a bicycle or other moving vehicles, as it's far too bulky. His method is not practical or adjustable for my invention's purpose. And except for the fact that his attachments suspend a television set, as my encasement's attachments do, the nature and design of his support frame, for all my intents and purposes, is quite different from my own.

DAVIES, U.S. Pat. No. 2,302,300
  discloses a carrier for the outside of a vehicle. His invention is unlike mine, except that it is mounted, and that it holds something. There is no protection for any entertainment unit mounted via his carrier, and it is plainly not practical for my intents and purposes. Upon further consideration, you will see it is not in the least bit similar.

SUMMARY OF THE INVENTION

The instant patent application relates to an encased entertainment unit which is portable, easily attachable and detachable, and light-weight, and which is fully equipped to be mounted onto a variety of moving vehicles, or wherever means for such attachment is available and suitable, via an assortment of built in attachment modes, which secure said unit onto corresponding receiver attachment modes which are equipped to cooperate with such attachment, and which have been secured onto place of attachment, like handlebars and stroller handles . . . by screws.

According to the present invention, the encasement surrounding the entertainment unit consisting of one or several of: radio, t.v., cassette player, c.d. player, video player . . . embodies means for suspending said unit onto vehicle, via carved out hollowed segments of said encasement box meant to clip onto pieces of tubing shaped clips which curve around place of attachment and are secured by screws;

half-square downward facing protrusions built onto encasement box, intended for hooking into square rings which are attached by material to other square rings suspended by curved extensions, which secure around place or attachment, and are fastened by screws;

female-headed snap openings built into material encasement lid meant to serve as a subsidiary cover (in the material encasement model), where an extra, material-made encasement is designed to fit around an already box-encased entertainment unit, and to serve as a carrying case when entire double encased entertainment unit is removed from its place of attachment. These female-headed snap openings are meant to snap onto a male-headed snap-studded strap which has been secured onto vehicle or place of attachment via looping into plastic or metal curved extensions which are secured to the place of attachment via screws; and hooks secured onto encasement boxes by material which loops around slit openings built into said boxes, meant to cooperate with rings which are suspended by their curved extensions, which secure around the place of attachment, and are attached by screws.

My invention is an improvement in carriers for radio and other assorted entertainment units, and has a variety of benefits, such as improved portability, improved stability of unit when attached onto vehicle, and outstanding protection of unit, since the entertainment unit is built directly into its own unique protective encasement box. My entertainment units have more flexibility in their design and usage. They are less limited than any other of the carrier modes available for entertainment units. Their attachment methods are simpler and easier to employ. There is also a wide selection of attachment modes, to suit different tastes. The units are easily detachable as well. The units are easy to use. And there is a far wider scope of portable entertainment methods available with my units. My encased entertainment units are safer to employ than any other portable units, as they do not require headphones to be heard. Manufacturing of my units would prove successful, as the product is very commercially attractive, and well-suited to modern day lifestyles and needs. My units are also attachable to a very wide variety of moving vehicles, as well as being attractive, convenient, and desirable.

Among the objects of my invention therefore, are:

To provide an improved portable, attachable entertainment unit which may be quickly and securely positioned for use on several kinds of moving vehicles and appropriate surfaces, without requiring permanent attachment;

To provide a variety of methods for attachment of these encased entertainment units, which are equipped with holes and carved out sections and straps and protrusions, meant to cooperate with accompanying hooks and clips and snaps and rings and tubing shaped pieces which are attached via screws to vehicles or other places of attachment, in order to meet assorted needs and desires of individuals;

To provide a wide variety of entertainment modes, to broaden entertainment choices for the individual outdoors;

To provide an entertainment unit which is completely protected from the elements by an encasement box which said unit is built directly into, and to provide such an encased unit with control switches which are protected from the elements as well, by protective coverings;

To provide easily controllable, easily accessible usage of control switches of entertainment units;

To provide a convenient, efficient, portable, attachable and detachable encased entertainment unit;

To provide an inexpensive to manufacture, pleasing in appearance, commercially desirable, portable, attachable, encased entertainment unit;

To provide a safer, portable entertainment unit which does not require headphones to be heard outdoors, and is therefore not a hazard near traffic, or when circumstances deem unobstructed hearing to be of upmost importance, for example, around babies, while riding on streets, while skidooing, while in a boat.

For other objects and for a better understanding of the invention, reference may be had to the following detailed descriptions, taken in connection with the accompanying drawings. Other features and advantages will hereinafter appear.

In the accompanying drawings, I have shown several forms I have contemplated embodying my invention, and such invention is fully disclosed in the accompanying specification and claims.

Although the drawings and specification disclose the best method in which I have contemplated embodying my invention, I desire in no way, to be limited to the details of such disclosure, for in the further application of my invention, slight changes in form and proportion may be made without departing from the spirit of my invention within the broad scope of the appended claim.

Please note, in certain drawings, where the encasement box is shown without the entertainment unit enclosed, it may appear that there is no cover for the unit. Such is not the case. Sometimes, the outer casing is illustrated opened up, for diagram purposes only. All units will be completely encased. And the unit which fits into and is covered by the material encasement, has already been enclosed in its own encasement box, ensuring protection at all times, when the unit is attached to the vehicle, or detached. The material encasement provides further coverage and protection, but is primarily meant for a means of attachment as well as for a carrying case when entire unit is dislodged. Where the snap attachment mode is illustrated, the unit, when removed, will be fully enclosed twice; When this material cover is dislodged from its place of attachment, the lid of this encasement, with its built in female-headed snap openings, is placed snap openings upwards, across the top of the unit, and closes the encasement fully via a corresponding closure on the other side of the material encasement it meets up with. This material encasement will then provide a carrying case for the user, as there is a hidden strap inside said material encasement, which can be taken out and utilized at any time.

It is when the material encasement lid is opened, that it provides a means of attachment for the unit, by cooperating with the male-headed snap-studded corresponding attachment strap. This is one example where the encasement box containing the entertainment unit, is fit into a subsidiary encasement, intended for use in attachment, and as an easily portable carrying case, once the whole unit is dismounted from the vehicle, providing easy portability and convenience.

When designed in leather, this encasement would probably be the fanciest of all encasements.

BRIEF DESCRIPTION OF THE DRAWINGS

A better understanding of the present invention may be had from a consideration of the following detailed description, taken in conjunction with the accompanying drawings in which.

PAGE TWO OF DRAWINGS

PAGE THREE OF DRAWINGS

PAGE FOUR OF THE DRAWINGS

DESCRIPTION OF THE PREFERRED EMBODIMENT

Figures 1, 2, 3, 4, 5:
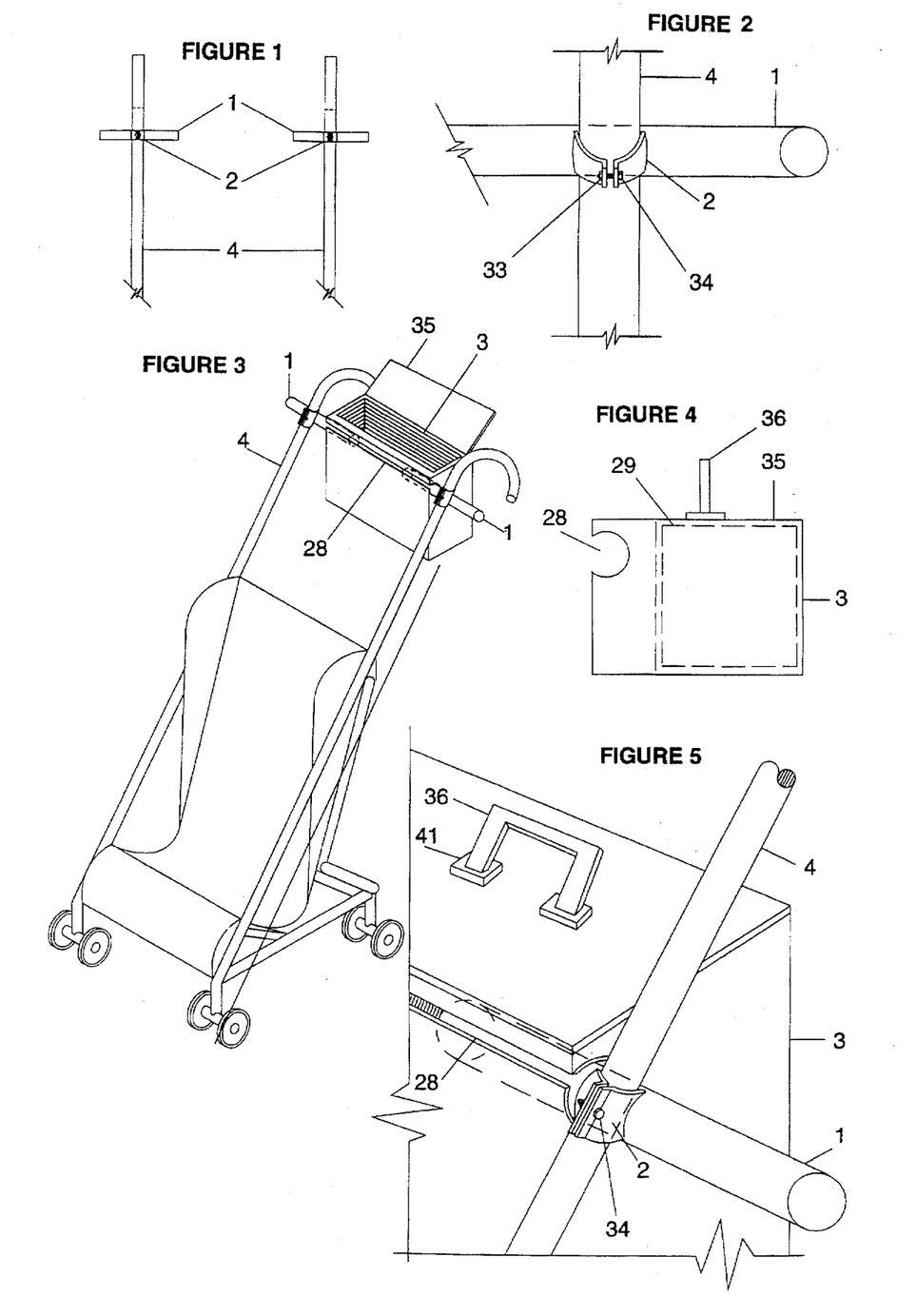
FIG. 1 is the frontal view of tubular clips attached to stroller handles. These form a base onto which an appropriately attachment-equipped entertainment unit will fit onto.
FIG. 2 is a blown up version of FIG. 1, showing in more detail how the tubular clips are attached by curved extensions which secure around handles of the stroller and fasten via screws and nuts.
FIG. 3 is a full view of the stroller and the tubular attachments with an opened encasement box intended for holding the entertainment unit, locking onto the attachments via its hollowed-out shaft. The entertainment unit is not shown, but will be fit right into the encasement box. Here, the box is open, for illustration purposes. We see the lid (35) of the box opened, but once the unit is enclosed, the lid will be closed.
FIG. 4 is a side view of the radio entertainment unit sample, showing a radio encased in its unique protective box. Clearly shown is a carved out, rounded out shaft, which will attach onto the tubular shaped clips which are attached to the stroller handles.
FIG. 5 is a detailed view of an encasement box, with a hollowed out shaft engaged onto the tubular shaped clip, which is attached onto the stroller handle by its curved extension (clip's extension), screw, and nut.

Referring now to FIG. 1, supporting tubular shaped clips (1) attach to stroller handle (4) by curved extension (2), which is attached to the stroller handle (4) via screw (34) and nut (33). These are the base onto which encasement boxes, equipped with hollowed-out shafts intended for use in attachment, will fit onto.

Referring now to FIG. 2, a larger version of FIG. 1, we see in detail a tubular shaped clip (1), the base for the attachment, and the curved extension (2) of the tubular clip (1) which holds the clip in place. The curved extension (2) of the tubular shaped clip (1) fits around the stroller handle (4) and is secured by a screw (34) and a nut (33).

Referring now to FIG. 3, we see an open encasement box (3) attached by its hollowed out shaft (28) to the clips(1). The clips (1) are attached to the stroller handles (4) by their curved extensions, screws, and nuts, which are not displayed in this figure, but which can be seen in FIGS. 1 and 2 (see FIG. 2-(33),(34)).

The entertainment unit of choice will fit into the encasement box (3). We see the opened lid (35) of the encasement box, which, when properly sealed will provide its top cover.

Referring now to FIG. 4, we see a side view of the closed encasement box (3), with its hollowed out shaft (28). We see the entertainment unit (29) fitted right into the encasement box. We see the top cover of the encasement box (35) in its closed position. And we see a handle (36) which is attached to the top of the encasement box (35) by hinges (unseen here, but displayed in FIG. 5 (see (41))) for carrying purposes when entire encased entertainment unit is dislodged.

Referring now to FIG. 5, we see the curved extension (2) of the tubular shaped clip (1) securing said base attachment tubular clip onto the stroller handle (4). We see the encasement box (3) for the entertainment unit, attached onto the clip (1) by its hollowed out shaft (28). We also see the way the curved extension (2) of the tubular shaped clip (1) is secured onto the stroller handle (4) via a screw (34) and a nut (unseen here, but visible in FIG. 2 (33)). We also see the top part of the encasement box (35) with its handle (36) which is attached to said top part (35) via hinges (41).

IN REFERENCE TO DRAWINGS ON PAGE 2

Figures 6, 7, 8:
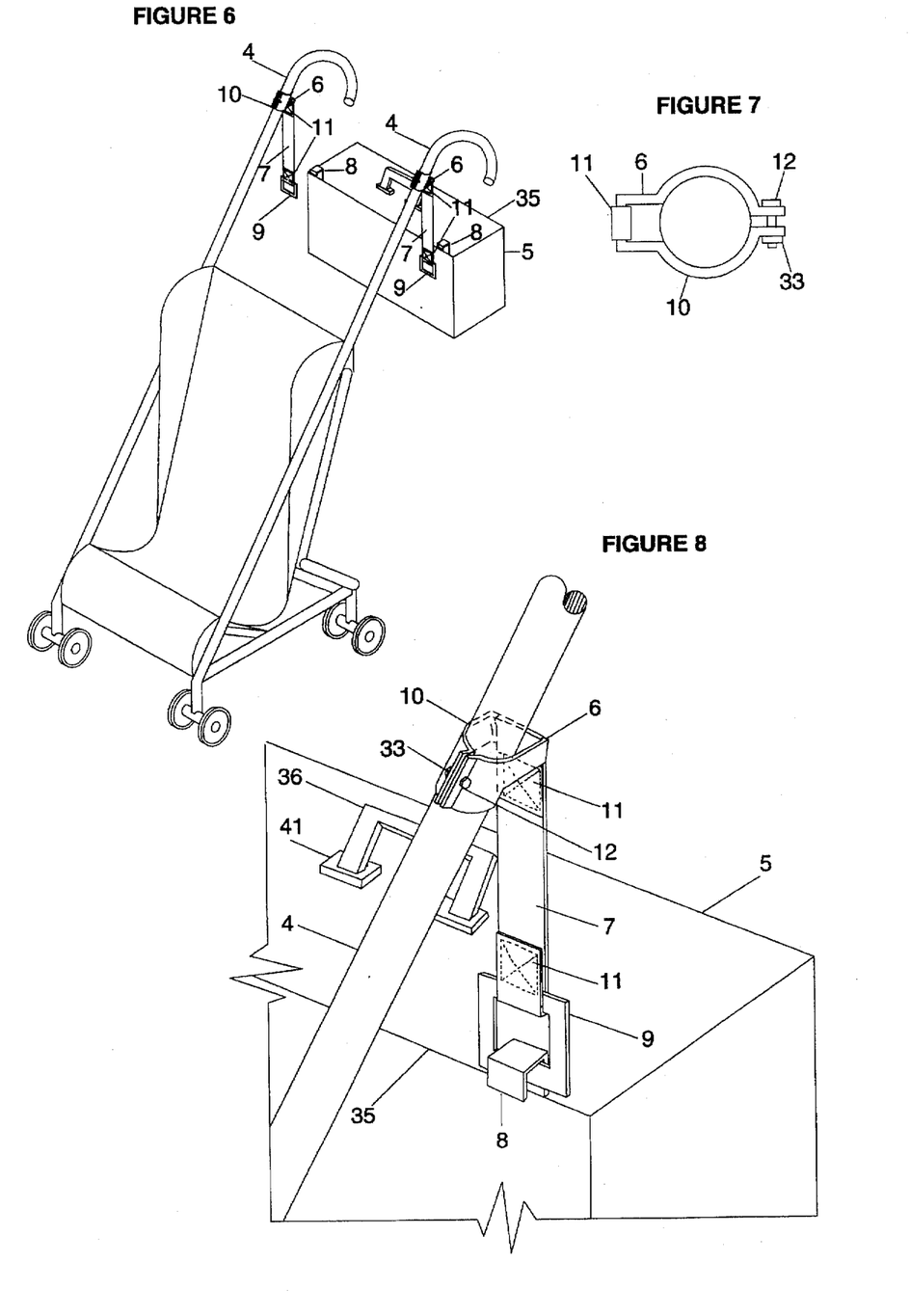
FIG. 6 is a full view of a stroller with canvas straps hanging from square rings, which are suspended by their curved extensions, which secure around the stroller handles. The encased entertainment unit, with its metal and plastic half square protrusion hooks, is shown on the verge of being engaged into square rings at the bottom of the canvas straps.
FIG. 7 is a detailed and top view of a suspended square ring designed to fit around the handles, and to hold encased entertainment unit via hanging straps equipped with square rings meant to engage protruding hooks on encasement box. We see how extension of ring is fastened by nut and screw.
FIG. 8 is a detailed view of the encasement box, with one of its built in hooks, which fits into square ring at the bottom of hanging canvas strap. The strap hangs from suspended square ring which is held onto the handle by extension which curves around the handle, and fastens by a screw and a nut.

Referring now to FIG. 6, we see a full view of a stroller, with the canvas strap method of attachment for the portable and attachable entertainment units.

Curved extensions of square rings (10) are attached onto the stroller handles (4). The square rings (6) protrude from these extensions. Hanging off the square rings (6), there are canvas straps (7). At the bottom of the canvas straps (7), there are other square rings (9). These are the rings which will hold the metal or plastic hook protrusions (8) which are part of the encasement box (5). These hook protrusions (8), fitted into the square rings (9) at the bottom of the straps (7) qualify as the point of attachment. The canvas straps (7) attach to the square rings (6) on the secured extensions (10) by means of a double-stitched loop (FIG. 7 (11)) on the canvas straps (7). At the bottom of the straps (7), there is another double-stitched loop (11) holding the bottom square ring (9) onto the strap (7). (35) is the top part of the encasement box, onto which a handle (unseen here, but illustrated in FIG. 8 (see (41)) is attached.

Referring now to FIG. 7, we see the curved extension (10) of the square ring (6) from a top view. It wraps around the stroller handle, and is secured by a small screw and a nut.

The canvas strap unseen in this point of view, but available for inspection in FIG. 6 (see (7)), attaches to the square protrusion (6) which is suspended by its curved extension (10), via a double-stitched loop (11) at the end of the canvas strap.

Referring now to FIG. 8, we see a more detailed version of the entertainment unit encasement (5), with its built in hooks (8), and how it attaches to the stroller handle (4). The curved extension (10) of the square ring, which is secured by a screw and a nut, secures said protruding ring (6). Onto ring (6), a canvas strap (7) is held by a double-stitched loop in the canvas (11). On the bottom of the canvas strap (7), there is another double-stitched loop (11), which is wrapped around a square ring (9). This square ring (9) is the hole entrance into which the hook (8) on the encasement box (5) will fit into. (35) is the top part of the encasement box which has a handle (36) which attaches to it by hinges (41).

IN REFERENCE TO DRAWINGS ON PAGE THREE

Figure 9:
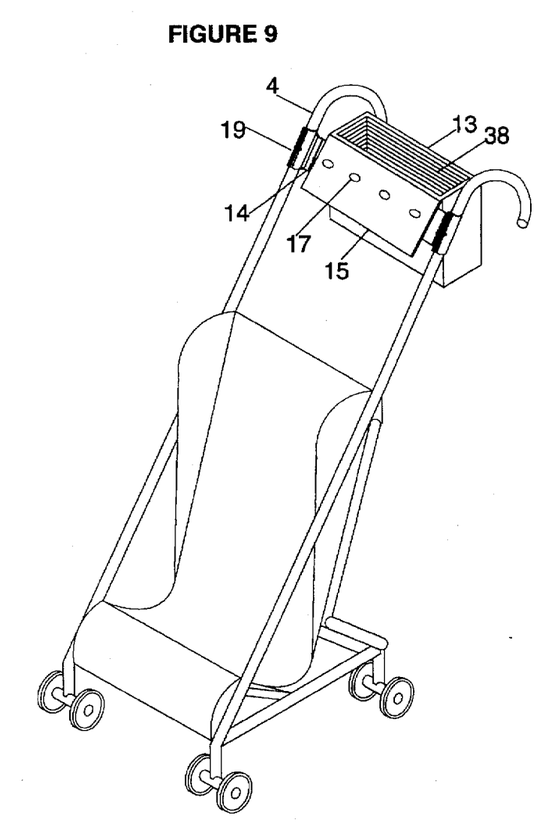
FIG. 9 is a full view of a stroller with attached material encasement cover holding encased entertainment unit. This double encased unit is attached via method of snap attachments.

Referring now to FIG. 9, we see a stroller holding a leather encased, encasement box enclosed entertainment unit, by means of snaps. There is a canvas or leather strap (14) which is suspended on the stroller handles (4) via looping into metal or plastic curved extensions (19). Across the strap (14) there are several male-headed snaps (see FIG. 11 (16)). The leather encasement (13) covers the enclosed entertainment unit of choice. The lid (15) of the encasement (13) opens up, and snaps onto the suspended support strap (14) by means of female-headed snaps (17) which are sewn into the lid portion (15) of the material encasement (13) so that they open onto the outside of the encasement, and are ready for attachment once lid (15) of encasement (13) is opened. The male-headed snaps can be seen in FIG. 11 (see (16)) in detail. (38) is encasement enclosed entertainment unit which fits into the material encasement (13) which provides subsidiary coverage, as well as a mode for attachment.

Figure 10:
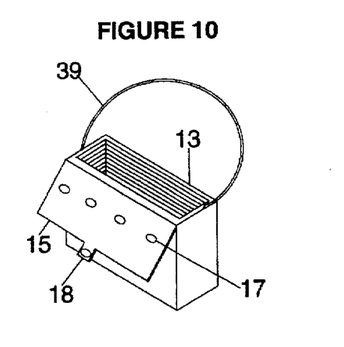
FIG. 10 is the material encasement box with its lid open. The lid has female snaps across its surface which face onto the outside of the lid, for attachment purposes. The closed side of the female snaps are visible here, as the lid is open, ready for attachment. It is the underside of this lid that has the openings of the female-headed snaps, which are intended to fit over the male-headed snaps on the strap based on the stroller, for attachment purposes. We also see a hanging strap meant for carrying the entire unit, once the unit is removed from its place of attachment. Said strap fits into the material casing, when not needed.

Referring now to FIG. 10, we see the encasement (13) for the entertainment unit. We see an open view from the back. The lid (15) of this encasement (13) has several female-headed snaps opening onto its outer side. We see the inside of the lid in this picture, with the closed ends of the snaps (17), because the lid is open. This flap opening (15) is what attaches onto the support strap on the stroller handles. Its underneath side has the female-headed snaps' openings, which are used for attachment purposes. We also see a strap (39) which is sewn into the material encasement, for transformation to carrying case, when encased entertainment unit is removed from place of attachment. Said strap fits into the material encasement box (13) while unit is attached to vehicle, and strap is not needed.

Figure 10B:
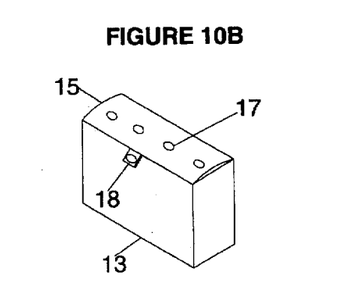
FIG. 10B is a closed view of FIG. 10, from the front. The open female-headed attachments are shown here. Once the lid is open, it attaches by these female openings onto the male-headed snaps secured on the strap base, which is secured on the stroller handles.

Referring now to FIG. 10B, we see a closed view of this encasement (13) from the front perspective. The buckle (18) keeps the lid (15) on the top of the enclosed entertainment unit, for easy portability and added protection. The lid (15) is now closed on top of the entertainment unit, and therefore, the female heads (17) are displayed in their open-ended state. When the lid (15) is opened, as in FIG. 10, the closed side of the female snaps (17) are visible, as they are when the unit is in its attached state.

Figure 11:
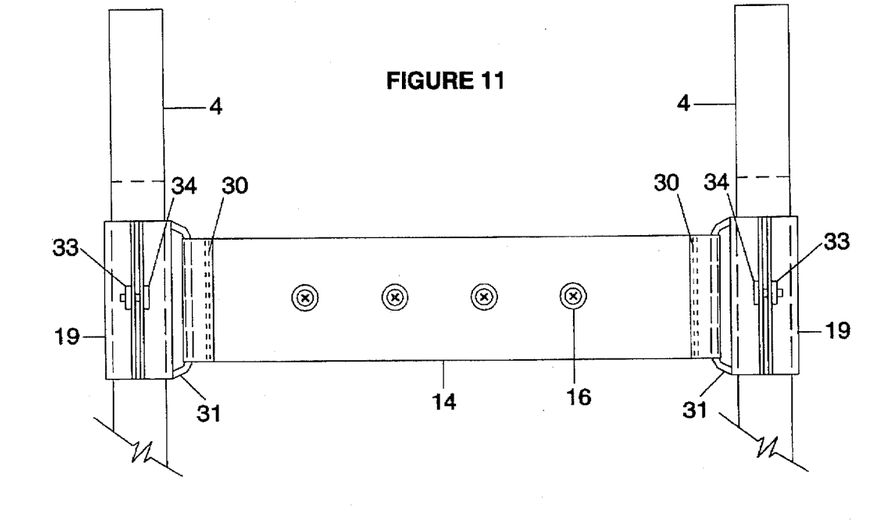
FIG. 11 shows the male snaps which run on a canvas, leather, or other material strap between two handlebars. They are suspended via looping into plastic or metal extensions, which curve around the place of attachment. The leather or canvas encased unit will snap onto this strap by the female-headed snaps on the inside of the encasement's lid.

Referring now to FIG. 11, we see how the canvas or leather support strap (14) is secured to the stroller handle (4) by means of curved extensions (19). These extensions (19) are secured to the handles by small screws and nuts.

There are material folds with double stitching (30) which hold the strap (14) onto curved extensions (19) at their metal or plastic half-square ring protrusion sections (31).

We see male-headed snaps (16) facing upwards to receive the top side portion of the lid flap opening (see FIG. 10B (15)), once it is inverted.

The open female-headed snaps on the lid's surface (see FIG. 10B (17)) will easily snap onto these male headed snaps (16).

IN REFERENCE TO DRAWINGS ON PAGE FOUR

Figures 12, 13, 14, 15:
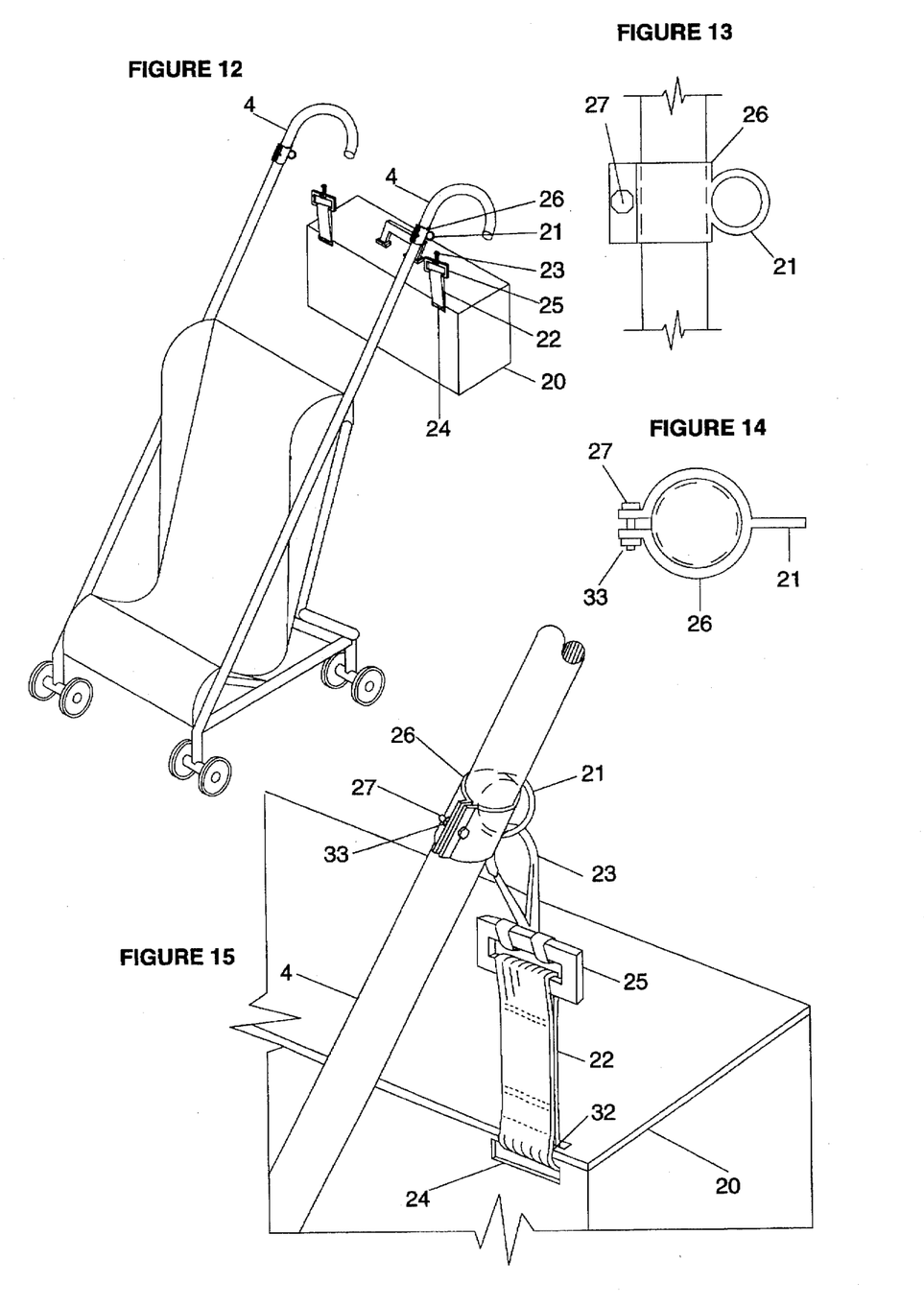
FIG. 12 is a full view of the stroller with another method of attachment. Hooks attached to the encased entertainment unit will clip onto rings which are attached to the stroller handles by extensions which curve around the stroller handles and fasten by screws and nuts.
FIG. 13 is a side view of the suspended ring on the stroller handle in detail. We see how the curved extension of the suspended ring fastens via screw and nut.
FIG. 14 is a top view of the curved extension of the suspended ring, with screw and nut.
FIG. 15 is a detailed drawing of an encasement box with a rectangular shaped cut out section. A looped canvas strap with an attached rectangular ring and clip, attaches to a circular ring which is suspended on the stroller handle via its curved extension. Extension fits around the handle, and is fastened by a screw.

Referring now to FIG. 12, we see a full view of a stroller with the hook or ring method of attachment for entertainment units. We see the curved extensions (26) of circular rings (21) attached to stroller handles (4) by means of a screw and a nut (not visible here, but visible in FIG. 14.

These circular rings (21) protrude to cooperate with clips (23). We see a closed encased entertainment unit (20) with carved out, rectangular-shaped slots (24). Attached to these slots (24), there is a piece of canvas (22). It is attached by a double-stitched loop (see FIG. 15 (32)). Also, this canvas is looped around a rectangular ring (25). Attached to this ring is a clip or hook (23).

This hook (23) fits into circular ring (21) which is suspended by curved extension (26) portion of said ring, providing a point of attachment.

Referring now to FIG. 13, we see a side view of more detailed curved extension (26) of circular rings (21), attached on the stroller handle (4). The protruding ring (21) is what the hook (see FIG. 12 (23)) will clip into. The curved extension portion (26) of the circular ring (21) is secured around the stroller handle (4) by a screw and a nut.

Referring now to FIG. 14, we see a top view of the curved extension portion (26) of the circular ring (21). Again, we see the curved extension portion (26), which secures around the stroller handle (4) by means of a screw and a nut. We also see the protruding suspended circular ring (21) from the top view.

Referring now to FIG. 15, we see how the entertainment unit encasement box (20) attaches to the stroller handle (4). The rectangular cut-out section (24) of the encasement box (20) has a piece of canvas (22) attached, by a double stitched loop (32). The piece of canvas (22) is sewn around a rectangular metal or plastic horizontal ring (25).

Attached to this ring (25) is a hook (23). This hook clips onto a protruding circular ring (21) which has a curved extension portion which secures around a stroller handle (4). This curved extension (26) is secured by a nut and a screw.

I claim:

1. An article carrying device for transporting an article on a transport vehicle, the article carrying device comprising:

an encasement box for holding the article, said encasement box having at least one of a female or a male snap member built into said encasement box;

means for attaching said encasement box to the transport vehicle including a strap made of flaccid material and having a first end and a second end, first and second clamps attached to the first and second ends of the strap respectively, each said first and second clamps having rigid extensions for attaching to a different portion of the vehicle, and said strap being provided with at least one or the other of the female or the male snap member for attaching the encasement box to the strap.

2. The article carrying device of claim 1 wherein the strap is made of canvas.

3. The article carrying device of claim 1 wherein the strap is made of leather.

4. The article carrying device of claim 1 wherein the first and second clamps are made of plastic.

5. The article carrying device of claim 1 wherein the first and second clamps are made of metal.

6. The article carrying device of claim 1 wherein the encasement box is made of leather.

7. The article carrying device of claim 1 wherein the encasement box is made of plastic.

8. The article carrying device of claim 1 wherein the encasement box is made of vinyl.

9. The article carrying device of claim 1 wherein the encasement box is made of canvas.

10. The article carrying device of claim 1 wherein the article carried is an entertainment unit.

* * * * *